US007991617B2

(12) United States Patent
Matsumoto (10) Patent No.: US 7,991,617 B2
(45) Date of Patent: Aug. 2, 2011

(54) OPTIMUM DESIGN MANAGEMENT APPARATUS FROM RESPONSE SURFACE CALCULATION AND METHOD THEREOF

(75) Inventor: Kazuhiro Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1078 days.

(21) Appl. No.: 11/785,902

(22) Filed: Apr. 20, 2007

(65) Prior Publication Data
US 2007/0198252 A1 Aug. 23, 2007

Related U.S. Application Data

(63) Continuation of application No. PCT/JP2004/016227, filed on Nov. 1, 2004.

(51) Int. Cl.
*G06G 7/48* (2006.01)
*G06F 15/18* (2006.01)
(52) U.S. Cl. ............ 704/270; 703/1; 703/2; 706/19
(58) Field of Classification Search .......... 704/245, 704/270; 703/1, 2, 6, 13; 706/19
See application file for complete search history.

(56) References Cited

U.S. PATENT DOCUMENTS

| | | | | |
|---|---|---|---|---|
| 5,155,677 A * | 10/1992 | Kurtzberg et al. | ............ | 700/36 |
| 5,781,430 A * | 7/1998 | Tsai | ............ | 700/28 |
| 5,966,527 A * | 10/1999 | Krivokapic et al. | ............ | 703/14 |
| 6,219,649 B1 * | 4/2001 | Jameson | ............ | 705/8 |
| 6,259,389 B1 * | 7/2001 | McGrath | ............ | 341/120 |
| 6,411,945 B1 * | 6/2002 | Nakajima | ............ | 706/19 |
| 6,606,612 B1 * | 8/2003 | Rai et al. | ............ | 706/15 |
| 6,636,862 B2 * | 10/2003 | Lundahl et al. | ............ | 707/999.101 |
| 6,934,666 B2 * | 8/2005 | Saban et al. | ............ | 703/2 |
| 6,980,939 B2 * | 12/2005 | Dhir et al. | ............ | 703/7 |
| 7,047,505 B2 * | 5/2006 | Saxena et al. | ............ | 716/2 |
| 7,269,517 B2 * | 9/2007 | Bondarenko | ............ | 702/19 |
| 7,389,212 B2 * | 6/2008 | Ferryanto et al. | ............ | 703/2 |

(Continued)

FOREIGN PATENT DOCUMENTS

JP         11-259433         9/1999
(Continued)

OTHER PUBLICATIONS

International Preliminary Report on Patentability, mailed Jun. 5, 2007, in corresponding International Application No. PCT/JP2004/016227 (5 pp.).

*Primary Examiner* — Martin Lerner
(74) *Attorney, Agent, or Firm* — Staas & Halsey LLP (57) ABSTRACT

An optimum design management apparatus that analyzes response variable values from groups of predictor variable values, and performs optimization using the analysis result, which includes a predictor variable transmission unit that transmits groups of predictor variable values to be used for the analysis to the calculation node, and a response variable reception unit that receives response variable values of the analysis result from the calculation node. The optimum design management apparatus includes a response surface calculation unit that calculates at least one response surface from groups of predictor variable values and response variable values, an optimization calculation unit that updates groups of predictor variable values coming close to a predetermined optimization condition in the response surface to new groups of predictor variable values, and a control unit that repeats the processing continuing from the predictor variable transmission unit until a predetermined end condition is fulfilled.

15 Claims, 4 Drawing Sheets

U.S. PATENT DOCUMENTS

| | | | |
|---|---|---|---|
| 7,555,092 B2 * | 6/2009 | Russell et al. | 376/215 |
| 7,676,390 B2 * | 3/2010 | Senturk et al. | 705/7 |
| 7,831,418 B1 * | 11/2010 | Sendhoff et al. | 703/6 |
| 7,904,281 B2 * | 3/2011 | Okamoto et al. | 703/6 |
| 2003/0074165 A1 * | 4/2003 | Saban et al. | 703/2 |
| 2004/0230412 A1 * | 11/2004 | Morman et al. | 703/8 |
| 2005/0004833 A1 * | 1/2005 | McRae et al. | 705/11 |
| 2006/0015829 A1 * | 1/2006 | De Smedt et al. | 716/2 |

FOREIGN PATENT DOCUMENTS

| | | |
|---|---|---|
| JP | 2001-306999 | 11/2001 |
| JP | 2003-114713 | 4/2003 |
| JP | 2004-110470 | 4/2004 |

* cited by examiner

| LONGITUDINAL | TRANSVERSAL | HEIGHT |
|---|---|---|
| A1 | B1 | C1 |
| A1 | B1 | C2 |
| A1 | B2 | C1 |
| A1 | B2 | C2 |
| A2 | B1 | C1 |
| A2 | B1 | C2 |
| A2 | B2 | C1 |
| A2 | B2 | C2 |

FIG.4

| STRESS |
|---|
| D1 |
| D2 |
| D3 |
| D4 |
| D5 |
| D6 |
| D7 |
| D8 |

FIG.5

| LONGITUDINAL | TRANSVERSAL | HEIGHT |
|---|---|---|
| A3 | B3 | C3 |
| A4 | B4 | C4 |
| A5 | B5 | C5 |
| A6 | B6 | C6 |

OPTIMUM DESIGN MANAGEMENT APPARATUS FROM RESPONSE SURFACE CALCULATION AND METHOD THEREOF

This application is a continuation of International Application No. PCT/JP2004/016227, filed Nov. 1, 2004, the disclosure of which is herein incorporated in its entirety by reference.

TECHNICAL FIELD

The present invention relates to an optimum design management apparatus, optimum design calculation system, optimum design management method, and optimum design management program, which perform the optimum design with respect to predictor variables and response variables.

BACKGROUND ART

In the conventional computing machine simulation, response variable values are verified by specifying predictor variable values assuming a particular case by the user. The predictor variables are variables being subjects for design such as longitudinal, transversal, and height dimensions, while the response variables are variables being subjects for optimization such as stresses. On the other hand, in recent years, as the capability of computing machines are being improved, there are realized optimum design calculation systems which, by examining response variable values with respect to the combination of predictor variable values assuming multiple cases, examine the relationship between predictor variables and response variables, or examine the combination of predictor variable values under which response variable values are optimum.

In conventional optimum design calculation systems, there are employed a method of calculating the combination of predictor variable values in the round-robin manner, and a method of reducing the number of combination of predictor variable values by presuming the linearity.

As conventional techniques related to the present invention, there is known a Patent Document 1 described below. In the Patent Document 1, there is disclosed an equipment reliability design support apparatus that allocates design variables of equipments and parts to an orthogonal table based on the Taguchi Method, analyzes a design analysis model or an inverse problem analysis model based on the orthogonal table, obtains a response surface based on the analysis result, and performs the optimum design using the response surface.
Patent Document 1: Jpn. Pat. Appln. Laid-Open Publication No. 2001-125933 (third to tenth page, FIG. 1)

DISCLOSURE OF THE INVENTION

Problems to be Solved by the Invention

However, in case the number of predictor variables is large, there are raised problems that the calculation cannot be ended within a realistic time period, or the selection of the combination of predictor variable values is not appropriate in case of the nonlinearity.

For example, in case of using an orthogonal table, it is possible to evenly set up the combination of predictor variable values. However, in case the interval between predictor variable values is too broad, or the linearity is presumed, this method is not suitable for the optimization of high accuracy. Furthermore, for example, the Taguchi Method determines the level of importance for each predictor variable using the SN ratio. However, in case the combination of predictor variables contributes to response variables, this method cannot present sufficient information to the user.

Furthermore, as for the response surface representing the relationship between predictor variables and response variables, generally, a single or a plurality of response surfaces are formed, and, of these response surfaces, a response surface that most appropriately represents the relationship between predictor variables and response variables is selected to be used for the optimization. The response surface can be obtained by employing the multiple regression analysis, and in case of the stress, when A, B, C, and D are coefficients, the stress is given as "Stress=A×longitudinal+B×transversal+C×height+D". However, since selecting the response surface requires the special knowledge concerning the statistical analysis, this method undesirably limits the user. Moreover, in selecting the response surface, generally, a response surface that appropriately represents the relationship between predictor variables and response variables over the entire range of predictor variable values is selected, while it cannot be necessarily said that thus selected response surface is appropriate in the region of predictor variables under which response variables are optimum, and there may be cases in which a problem is raised in accuracy of response surface. Furthermore, since only a single response surface is selected, the retrieval range of optimization is undesirably narrowed, which may make the accuracy of optimization insufficient.

Accordingly, in calculating the combination of predictor variable values under which response variable values are optimum, since the user repeats the calculation of optimum design by trial and error, the accuracies of the calculation result are fluctuated depending on the users, and some of the users may give up the calculation.

Furthermore, in recent years, an abundance of capabilities of computing machines are utilizable such as a computing machine of the SMP (Symmetric Multiple Processor) type having loaded therein a plurality of CPUs (Central Processing Units), a computing machine system of the cluster type in which a plurality of computing machines are connected by a network, and a grid computing in which computing machines in a wider range are connected by a network. However, such an abundance of capabilities of computing machines have not been used to improve the calculation accuracy.

It is therefore an object of the present invention to overcome the above-mentioned drawbacks by providing an optimum design management apparatus, optimum design calculation system, optimum design management method, and optimum design management program, which can improve the accuracy of optimum design without increasing the degree of difficulty with respect to the user.

Means for Solving the Problems

According to the present invention, there is provided an optimum design management apparatus that analyzes response variable values from groups of predictor variable values, and performs optimization using the analysis result, including: a predictor variable transmission unit that transmits groups of predictor variable values to be used for the analysis to the calculation node, and designates the analysis; a response variable reception unit that receives response variable values of the analysis result from the calculation node; a response surface calculation unit that calculates at least one response surface from groups of predictor variable values and response variable values; an optimization calculation unit that updates groups of predictor variable values coming close to a predetermined optimization condition in the response surface to new groups of predictor variable values; and a control unit that repeats the processing continuing from the predictor variable transmission unit until a predetermined end condition is fulfilled.

The optimum design management apparatus according to the present invention further includes: a clustering calculation unit that culls and clusters groups of predictor variable values calculated by the optimization calculation unit into representative groups of predictor variable values of a predetermined number.

In the optimum design management apparatus according to the present invention, the response surface calculation unit calculates a plurality of response surfaces using different algorithms.

In the optimum design management apparatus according to the present invention, the response surface is a response surface free of error which is obtained by modeling the relationship between predictor variables and response variables such that no error is raised.

In the optimum design management apparatus according to the present invention, the response surface calculation unit calculates a plurality of response surfaces by carrying out the processing of calculating a response surface using a plurality of extracted groups of predictor variable values and response variable values, allowing overlapping, by a plurality of times with the manner of extraction changed, and outputs a response surface that is represented by the representative value of the plural response surfaces.

In the optimum design management apparatus according to the present invention, the response surface calculation unit calculates a plurality of response surfaces using different algorithms, and outputs a response surface that is represented by the representative value of the plural response surfaces.

In the optimum design management apparatus according to the present invention, the optimization condition is groups of predictor variable values under which response variable values are optimum.

In the optimum design management apparatus according to the present invention, the optimization condition is groups of predictor variable values under which the distribution of response variable values is even.

In the optimum design management apparatus according to the present invention, the optimization condition is groups of predictor variable values under which the deviation of predictor variable values and response variable values is small.

In the optimum design management apparatus according to the present invention, being groups of predictor variable values under which response variable values are optimum is set to the first condition, while being groups of predictor variable values under which the distribution of response variable values and predictor variable values is even is set to the second condition, and the optimization condition fulfills the first condition and second condition at a predetermined ratio.

In the optimum design management apparatus according to the present invention, the response surface calculation unit abbreviates response variable values which are not optimum and groups of predictor variable values corresponding to the response variable values, and calculates a response surface.

In the optimum design management apparatus according to the present invention, in case groups of predictor variables used by the predictor variable transmission unit and groups of predictor variable values coming close to the predetermined optimization condition fulfill a predetermined similarity, the optimization calculation unit sets the groups of predictor variable values coming close to the predetermined optimization condition to the groups of predictor variable values used by the predictor variable transmission unit, and corresponding response variable values of the analysis result are substituted for the next analysis result, and the predictor variable transmission unit and response variable reception unit will not be made to operate next time with respect to the substituted response variable values.

According to the present invention, there is also provided an optimum design management apparatus that analyzes response variable values from groups of predictor variable values, and performs optimization using the analysis result, including: a predictor variable transmission unit that transmits groups of predictor variable values to be used for the analysis to the calculation node, and designates the analysis; a response variable reception unit that receives response variable values of the analysis result from the calculation node; a statistical information calculation unit that calculates regression tree data from groups of predictor variable values and response variable values; and a display image generation unit that generates display images based on the regression tree data.

The optimum design management apparatus according to the present invention further includes: an intensive calculation unit that updates predictor variable values under which response variable values fulfill a predetermined response variable range to new groups of predictor variable values using the regression tree data; and a control unit that repeats the processing continuing from the predictor variable transmission unit until a predetermined end condition is fulfilled.

According to the present invention, there is also provided an optimum design management apparatus that analyzes response variable values from groups of predictor variable values, and performs optimization using the analysis result, including: a predictor variable transmission unit that transmits groups of predictor variable values to the calculation node, and designates the analysis; a response variable reception unit that receives response variable values from the calculation node; a statistical information calculation unit that calculates principal component analysis data from groups of predictor variable values and response variable values; and a display image generation unit that generates display images based on the principal component analysis data.

The optimum design management apparatus according to the present invention further includes: an intensive calculation unit that updates predictor variable values under which response variable values fulfill a predetermined response variable range to new groups of predictor variable values using the principal component analysis data; and a control unit that repeats the processing continuing from the predictor variable transmission unit until a predetermined end condition is fulfilled.

According to the present invention, there is also provided an optimum design management apparatus that analyzes response variable values from groups of predictor variable values, and performs optimization using the analysis result, including: a predictor variable transmission unit that transmits groups of predictor variable values to the calculation node, and designates the analysis; a response variable reception unit that receives response variable values from the calculation node; a statistical information calculation unit that calculates neural network data from groups of predictor variable values and response variable values; and a display image generation unit that generates display images based on the neural network data.

According to the present invention, there is also provided an optimum design calculation system that analyzes response variable values from groups of predictor variable values, and performs optimization using the analysis result, including: a predictor variable transmission unit that transmits groups of predictor variable values to be used for the analysis to the calculation node, and designates the analysis; a calculation node that performs the analysis based on predictor variable values from the predictor variable transmission unit, and calculates response variable values of the analysis result; a response variable reception unit that receives response variable values of the analysis result from the calculation node; a response surface calculation unit that calculates at least one response surface from groups of predictor variable values and response variable values; an optimization calculation unit that updates groups of predictor variable values coming close to a predetermined optimization condition in the response surface to new groups of predictor variable values; and a control unit that repeats the processing continuing from the predictor variable transmission unit until a predetermined end condition is fulfilled.

According to the present invention, there is also provided an optimum design management method that analyzes response variable values from groups of predictor variable values, and performs optimization using the analysis result, including: a predictor variable transmission step that transmits groups of predictor variable values to be used for the analysis to the calculation node, and designates the analysis; a response variable reception step that receives response variable values of the analysis result from the calculation node; a response surface calculation step that calculates at least one response surface from groups of predictor variable values and response variable values; an optimization calculation step that updates groups of predictor variable values coming close to a predetermined optimization condition in the response surface to new groups of predictor variable values; and a control step that repeats the processing continuing from the predictor variable transmission step until a predetermined end condition is fulfilled.

According to the present invention, there is also provided an optimum design management method that analyzes response variable values from groups of predictor variable values, and performs optimization using the analysis result, including: a predictor variable transmission step that transmits groups of predictor variable values to be used for the analysis to the calculation node, and designates the analysis; a response variable reception step that receives response variable values of the analysis result from the calculation node; a statistical information calculation step that calculates regression tree data from groups of predictor variable values and response variable values; and a display image generation step that generates display images based on the regression tree data.

According to the present invention, there is also provided an optimum design management method that analyzes response variable values from groups of predictor variable values, and performs optimization using the analysis result, including: a predictor variable transmission step that transmits groups of predictor variable values to the calculation node, and designates the analysis; a response variable reception step that receives response variable values from the calculation node; a statistical information calculation step that calculates principal component analysis data from groups of predictor variable values and response variable values; and a display image generation step that generates display images based on the principal component analysis data.

According to the present invention, there is also provided an optimum design management method that analyzes response variable values from groups of predictor variable values, and performs optimization using the analysis result, including: a predictor variable transmission step that transmits groups of predictor variable values to the calculation node, and designates the analysis; a response variable reception step that receives response variable values from the calculation node; a statistical information calculation step that calculates neural network data from groups of predictor variable values and response variable values; and a display image generation step that generates display images based on the neural network data.

According to the present invention, there is also provided an optimum design management program that makes a computer execute an optimum design management method that analyzes response variable values from groups of predictor variable values, and performs optimization using the analysis result, the program makes the computer execute the steps including: a predictor variable transmission step that transmits groups of predictor variable values to be used for the analysis to the calculation node, and designates the analysis; a response variable reception step that receives response variable values of the analysis result from the calculation node; a response surface calculation step that calculates at least one response surface from groups of predictor variable values and response variable values; an optimization calculation step that updates groups of predictor variable values coming close to a predetermined optimization condition in the response surface to new groups of predictor variable values; and a control step that repeats the processing continuing from the predictor variable transmission step until a predetermined end condition is fulfilled.

According to the present invention, there is also provided an optimum design management program that makes a computer execute an optimum design management method that analyzes response variable values from groups of predictor variable values, and performs optimization using the analysis result, the program makes the computer execute the steps including: a predictor variable transmission step that transmits groups of predictor variable values to be used for the analysis to the calculation node, and designates the analysis; a response variable reception step that receives response variable values of the analysis result from the calculation node; a statistical information calculation step that calculates regression tree data from groups of predictor variable values and response variable values; and a display image generation step that generates display images based on the regression tree data.

According to the present invention, there is also provided an optimum design management program that makes a computer execute an optimum design management method that analyzes response variable values from groups of predictor variable values, and performs optimization using the analysis result, the program makes the computer execute the steps including: a predictor variable transmission step that transmits groups of predictor variable values to the calculation node, and designates the analysis; a response variable reception step that receives response variable values from the calculation node; a statistical information calculation step that calculates principal component analysis data from groups of predictor variable values and response variable values; and a display image generation step that generates display images based on the principal component analysis data.

According to the present invention, there is also provided an optimum design management program that makes a computer execute an optimum design management method that analyzes response variable values from groups of predictor variable values, and performs optimization using the analysis result, the program makes the computer execute the steps including: a predictor variable transmission step that transmits groups of predictor variable values to the calculation node, and designates the analysis; a response variable reception step that receives response variable values from the calculation node; a statistical information calculation step that calculates neural network data from groups of predictor variable values and response variable values; and a display image generation step that generates display images based on the neural network data.

BEST MODE FOR CARRYING OUT THE INVENTION

An embodiment of the present invention will further be described below with reference to the accompanying drawings.

Figure 1:
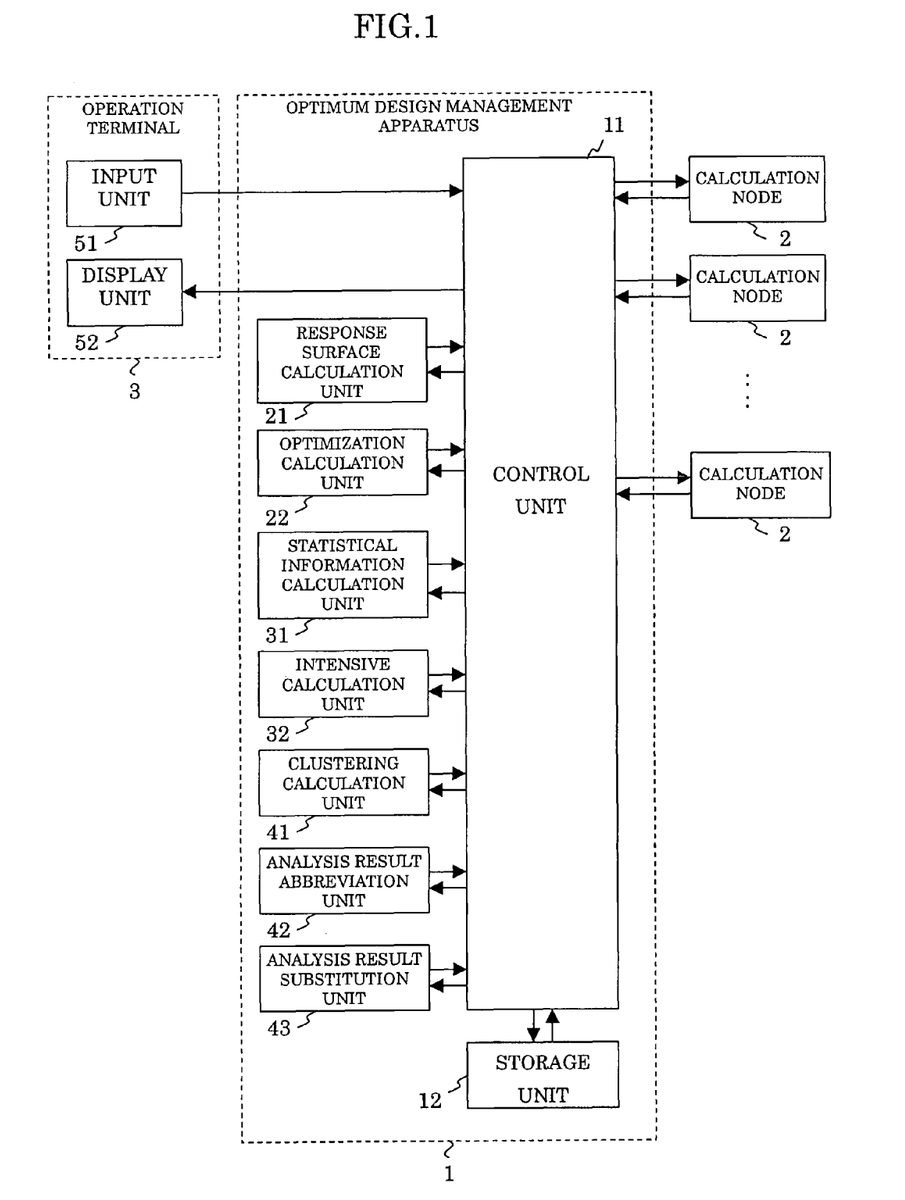
FIG. 1 shows a block diagram indicative of one example of the configuration of the optimum design calculation system according to the present invention.

Firstly, the configuration of the optimum design calculation system will be explained. FIG. 1 shows a block diagram indicative of one example of the configuration of the optimum design calculation system according to the present invention. This optimum design calculation system includes an optimum design management apparatus 1, a plurality of calculation nodes 2, and an operation terminal 3. The optimum design calculation system is realized by a grid computing system or a cluster type computing machine system. The optimum design management apparatus 1 is a management server, the operation terminal 3 is a terminal of the user, and the calculation nodes 2 are computers such as PCs (Personal Computers) or work stations. These components are connected through a network. The optimum design management apparatus 1 includes a control unit 11, a storage unit 12, a response surface calculation unit 21, an optimization calculation unit 22, a statistical information calculation unit 31, an intensive calculation unit 32, a clustering calculation unit 41, an analysis result abbreviation unit 42, and an analysis result substitution unit 43. The operation terminal 3 includes an input unit 51 and a display unit 52.

Figure 2:
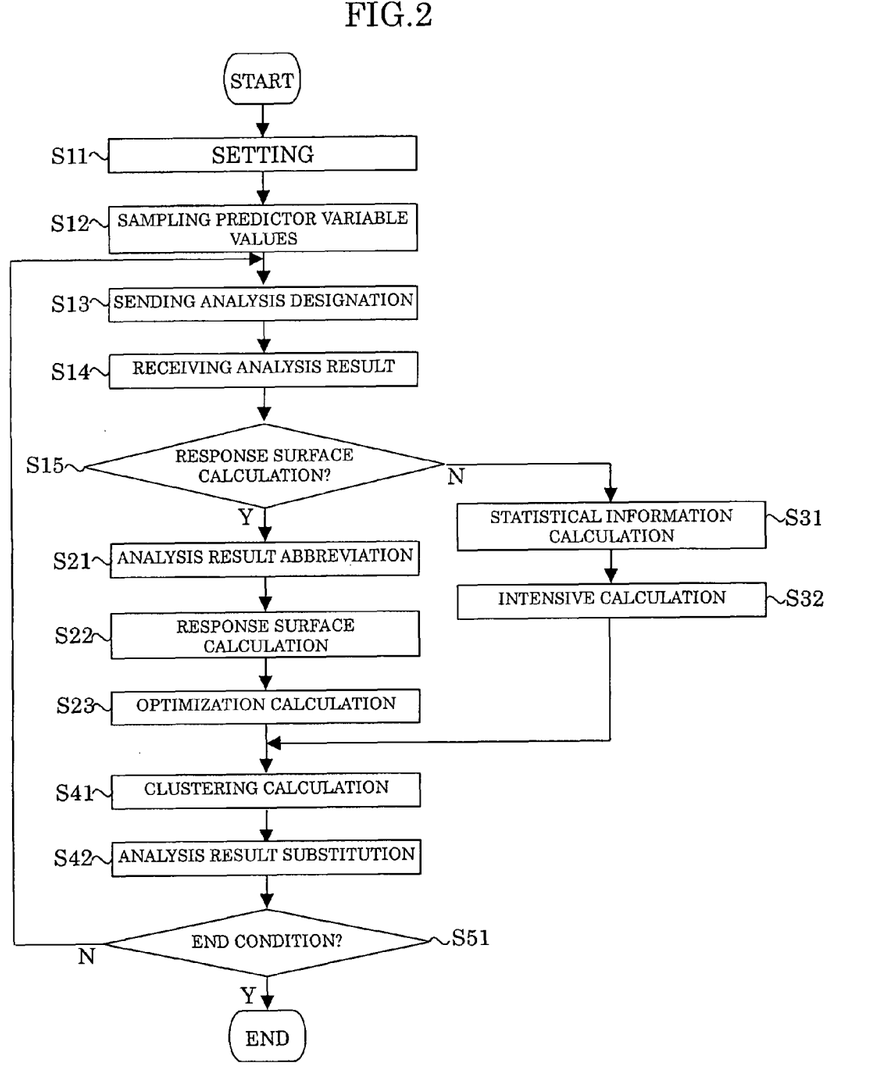
FIG. 2 shows a flowchart indicative of one example of the performance of the optimum design management apparatus according to the present invention.

Next, the performance of the optimum design management apparatus 1 will be explained. FIG. 2 shows a flowchart indicative of one example of the performance of the optimum design management apparatus 1 according to the present invention. Firstly, the control unit 11 stores setting values for the optimum design calculation in the storage unit 12 in accordance with inputs from the input unit 51 by the user (S11). The setting values are, for example, a predictor variable range representing the range of predictor variable values, a response variable range representing the range of response variable values, predictor variable values, response variable values, an end condition, the number of abbreviations, number of outputs, ratio of optimization and modeling, etc. The individual setting values will be explained later.

Figure 3:
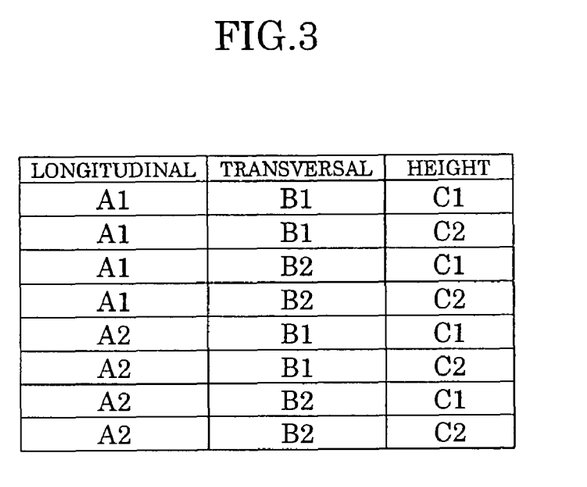
FIG. 3 shows a table indicative of one example of groups of predictor variable values.

Next, the control unit 11 forms groups of predictor variable values by a predetermined number by sampling predictor variable values of initial values in the predictor variable range, and stores thus formed groups of predictor variable values in the storage unit 12 (S12). Next, the control unit 11 allocates the groups of predictor variable values of initial values stored in the storage unit 12, or groups of predictor variable values of the optimization result to the respective calculation nodes 2 as groups of predictor variable values to be used for analysis, and sends the groups of predictor variable values to the respective calculation nodes 2 together with designation for analysis (S13). FIG. 3 shows a table indicative of one example of groups of predictor variable values. In this example, the predictor variables are longitudinal, transversal, and height dimensions, and predictor variable values for eight groups are sampled.

Figure 4:
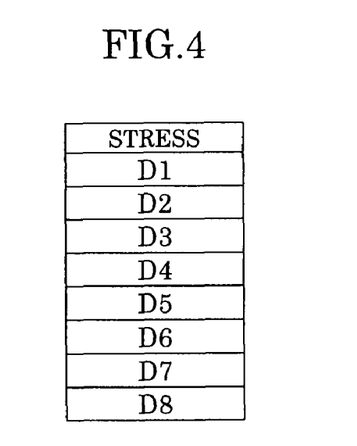
FIG. 4 shows a table indicative of one example of response variable values.

When receiving the designation for analysis and the groups of predictor variable values, the respective calculation nodes 2 calculate response variable values using an analysis program distributed in advance, and send thus calculated response variable values to the control unit 11 as response variable values of the analysis result. FIG. 4 shows a table indicative of one example of response variable values. In this example, the response variables are stresses, and eight response variable values of the analysis result, which are calculated using an analysis program for the respective groups of predictor variable values shown in FIG. 3, are shown.

Next, the control unit 11 receives the response variable values of the analysis result from the respective calculation nodes 2, and, making the response variable values correspond to the predictor variable values used for analysis, stores the predictor variable values and response variable values in the storage unit 12 as groups of predictor variable values and response variable values of the analysis result (S14). When receiving all the response variable values, the control unit 11 judges whether or not the response surface calculation will be carried out (S15).

In case of carrying out the response surface calculation (S15, Y), the control unit 11 sends the groups of predictor variable values and response variable values of the analysis result, and the number of abbreviations being the setting value to the analysis result abbreviation unit 42 so as to designate the analysis result abbreviation (S21). The analysis result abbreviation unit 42 abbreviates groups of predictor variable values and response variable values of the analysis result corresponding to the number of abbreviations from a group whose response variable values are not optimum, and sends the resulting groups of predictor variable values and response variable values to the control unit 11. The control unit 11 updates the groups of predictor variable values and response variable values of the analysis result stored in the storage unit 12 to the groups of predictor variable values and response variable values sent from the analysis result abbreviation unit 42.

Next, the control unit 11 sends data or the groups of predictor variable values and response variable values of the analysis result etc. stored in the storage unit 12 to the response surface calculation unit 21 so as to designate the response surface calculation (S22). The response surface calculation unit 21 calculates response surfaces of a predetermined number from the groups of predictor variable values and response variable values of the analysis result, and sends thus obtained response surfaces to the control unit 11. The control unit 11 stores the obtained response surfaces in the storage unit 12.

Figure 5:
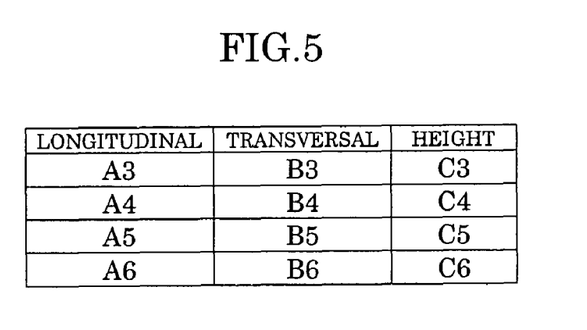
FIG. 5 shows a table indicative of one example of groups of predictor variable values of the optimization result.

Next, the control unit 11 sends the stored data to the optimization calculation unit 22 so as to designate the optimization calculation (S23). Then, the optimization calculation unit 22 calculates groups of predictor variable values under which response variable values are optimum in response surfaces, and sends thus calculated groups of predictor variable values to the control unit 11 as groups of predictor variable values of the optimization result. The control unit 11 stores the groups of predictor variable values of the optimization result in the storage unit 12. FIG. 5 shows a table indicative of one example of groups of predictor variable values of the optimization result. In this example, similar to FIG. 3, the predictor variables are longitudinal, transversal, and height dimensions, and predictor variable values for four groups are sampled.

On the other hand, in case of not carrying out the response surface calculation (S15, N), the control unit 11 sends data or the groups of predictor variable values and response variable values of the analysis result etc. stored in the storage unit 12 to the statistical information calculation unit 31 so as to designate the statistical information calculation (S31). The statistical information calculation unit 31 generates statistical information from the groups of predictor variable values and response variable values of the analysis result, and sends thus obtained statistical information to the control unit 11. The control unit 11 stores the obtained statistical information in the storage unit 12.

Next, the control unit 11 sends the groups of predictor variable values and response variable values of the analysis result, statistical information, and the predictor variable range, response variable range, similarity threshold value being the setting values, which are stored in the storage unit 12, to the intensive calculation unit 32 so as to designate the optimization calculation (S32). The intensive calculation unit 32 performs the optimization calculation of sampling groups of predictor variable values which fulfill a predetermined condition in the predictor variable range, and sends the resulting groups of predictor variable values to the control unit 11 as groups of predictor variable values of the optimization result. The control unit 11 stores the groups of predictor variable values of the optimization result in the storage unit 12.

Next, the control unit 11 sends the groups of predictor variable values of the optimization result, and the number of outputs being the setting value to the clustering calculation unit 41 so as to designate the clustering calculation (S41). The clustering calculation unit 41 performs the clustering calculation of culling and clustering the multiple groups of predictor variable values of the optimization result into representative groups of predictor variable values corresponding to the number of outputs, and sends thus clustered groups of predictor variable values to the control unit 11. As a method to carry out the clustering calculation, the furthest neighbor method, Ward method, etc. may be employed. The control unit 11 updates the groups of predictor variable values of the optimization result stored in the storage unit 12 to the groups of predictor variable values sent from the clustering calculation unit 41. By employing the clustering calculation, the resource for the next analysis can be reduced, and the accuracy of optimization in performing wide-area search can be improved.

Next, the control unit 11 sends the groups of predictor variable values and response variable values of the analysis result, groups of predictor variable values and response variable values of the optimization result, response surfaces, and the predictor variable range, similarity threshold value being the setting values to the analysis result substitution unit 43 from the storage unit 12 so as to designate the analysis result substitution (S42). The analysis result substitution unit 43 calculates groups of predictor variable values of the analysis result, groups of predictor variable values of the optimization result, and similarity for each combination. The similarity of two predictor variable values is calculated as the inverse number of the sum of squares of the difference of the two predictor variable values. In case the maximum value of the similarity exceeds the similarity threshold value, the optimization calculation unit 22 replaces the groups of predictor variable values and response variable values of the optimization result corresponding to the maximum value of the similarity, that is, groups of predictor variable values to be used for the next analysis and response variable values of the analysis result, with the groups of predictor variable values and response variable values which have been used for the analysis, and the next analysis will not be performed with respect to the groups of predictor variable values and response variable values. By employing the analysis result substitution, response surfaces which put emphasis on the region of predictor variable values of the optimization result can be formed, and the resource for the analysis can be reduced.

Next, the control unit 11 judges whether or not the end condition is fulfilled (S51). The end condition is the upper limit of the number of repeated calculation times, and the similarity threshold value of groups of predictor variable values of the analysis result and groups of predictor variable values of the optimization result. In case the end condition is fulfilled (S51, Y), this flow is ended. On the other hand, in case the end condition is not fulfilled (S51, N), the processing returns to S13.

Next, the details of the performance of the response surface calculation will be explained. The response surface calculation unit 21 employs one of the following four response surface calculation methods. In case of calculating a plurality of response surfaces, these plural response surfaces can be calculated in parallel by providing the plural response surface calculation units 21.

Firstly, the first response surface calculation method will be explained. The control unit 11 sends K (K is integer) groups of predictor variable values and response variable values of the analysis result to the response surface calculation unit 21. Next, the response surface calculation unit 21 performs the response surface calculation using different L (L is integer) algorithms, and obtains L response surfaces. In carrying out the response surface calculation, the multiple regression analysis, neural network, etc. may be employed. Then, the response surface calculation unit 21 sends thus obtained L response surfaces to the control unit 11.

Next, the second response surface calculation method will be explained. In this response surface calculation method, a response surface free of error, which is obtained by modeling the relationship between predictor variables and response variables such that no error is raised, is calculated. Firstly, the control unit 11 sends K groups of predictor variable values and response variable values of the analysis result to the response surface calculation unit 21. When numbers of the groups of predictor variable values and response variable values of the analysis result are set up such that the predictor variable is Xi, response variable is Yi, relationship between the predictor variable and the response variable is $Yi=Fi(Xi)$, where i=1 to K, for example, in case of K=3, A1, A2, and A3 are defined by the following mathematical expressions.

$$A1=Y1/(F2(X1)-Y2)/(F3(X1)-Y3)$$

$$A2=Y2/(F3(X2)-Y3)/(F1(X2)-Y1)$$

$$A3=Y3/(F1(X3)-Y1)/(F2(X3)-Y2)$$

Using these values, the response surface free of error F(X) can be obtained by using the following mathematical expression.

$$F(X)=A1*(F2(X)-Y2)*(F3(X)-Y3)$$

$$+A2*(F3(X)-Y3)*(F1(X)-Y1)$$

$$+A3*(F1(X)-Y1)*(F2(X)-Y2)$$

The response surface calculation unit 21 sends thus obtained response surface free of error to the control unit 11 as a response surface. In this example, the case in which K=3 is explained. On the other hand, in case K is other than 3, the F (X) can be similarly obtained.

Next, the third response surface calculation method will be explained. Firstly, the control unit 11 sends K groups of predictor variable values and response variable values of the analysis result, and the number M (M is integer) of response surfaces being the setting value to the response surface calculation unit 21. The response surface calculation unit 21 extracts K groups of predictor variable values and response variable values from among the K groups of predictor variable values and response variable values, allowing overlapping, to calculate a response surface. Furthermore, changing the manner of overlapping, the response surface calculation unit 21 extracts K groups of predictor variable values and response variable values, and repeats the response surface calculation M times to calculate M response surfaces. Finally, the response surface calculation unit 21 calculates a response surface that is represented by the representative value of the M response surfaces, and sends thus calculated representative response surface to the control unit 11. By employing this response surface calculation method, the influence by groups of predictor variable values and response variable values of low reliability can be reduced, and the accuracy of optimization in case the number of analysis results is small can be improved.

Next, the fourth response surface calculation method will be explained. Firstly, the control unit 11 sends K groups of predictor variable values and response variable values, the number N (N is integer) of algorithms, and the kinds of the N algorithms to the response surface calculation unit 21. The response surface calculation unit 21 calculates N response surfaces using the different N algorithms. Next, the response surface calculation unit 21 calculates a response surface that is represented by the representative value of the N response surfaces, and sends thus calculated representative response surface to the control unit 11. By employing this response surface calculation method, the response surface and the accuracy of optimization using this can be improved.

Next, the details of the performance of the optimization calculation will be explained. The optimization calculation unit 22 employs one of the following four optimization calculation methods. In the initial stage of the optimum design, the second optimization calculation method or third optimization calculation method is selected, while in the terminal stage, the first optimization calculation method is selected. In case of carrying out the optimum design with the balance thereof taken into consideration, the fourth optimization calculation method is selected.

Firstly, the first optimization calculation method will be explained. This optimization calculation method is employed in case the user narrows down groups of predictor variable values. At first, the control unit 11 sends the predictor variable range and response surface to the optimization calculation unit 22. The optimization calculation unit 22 calculates groups of predictor variable values under which response variable values are optimum in the response surface by employing the steepest descent method or genetic algorithm, etc., and sends thus calculated groups of predictor variable values to the control unit 11 as groups of predictor variable values of the optimization result.

Next, the second optimization calculation method will be explained. In this optimization calculation method, response variables are modeled, and this method is used when the object is sampling groups of predictor variable values under which the distribution of response variable values is even, and the user figures out the state of the entire response variable range. At first, the control unit 11 sends the predictor variable range, response surface, and response variable values of the analysis result to the optimization calculation unit 22. The optimization calculation unit 22 sets the intermediate value of the maximum interval among intervals of the response variable values to an optimization subject value. By performing the optimization calculation with the evaluation that response variable values calculated using the response surface come close to the optimization subject value, the optimization calculation unit 22 sends groups of predictor variable values under which response variable values are close to the optimization subject value to the control unit 11 as groups of predictor variable values of the optimization result.

Next, the third optimization calculation method will be explained. In this optimization calculation method, predictor variables are modeled, and this method is used when the object is sampling groups of predictor variable values under which the deviation of predictor variable values and response variable values is small, and the user figures out the state of the entire predictor variable range. At first, the control unit 11 sends the predictor variable range, response surface, and groups of predictor variable values to the optimization calculation unit 22. Next, the optimization calculation unit 22 samples the groups of predictor variable values in the predictor variable range, calculates response variable values using the response surface, and calculates the similarity of the groups of predictor variable values and response variable values. The similarity of the groups of predictor variable values and response variable values is calculated as the inverse number of the sum of squares of the difference of the respective predictor variable values and response variable values. Next, the optimization calculation unit 22 sends groups of predictor variable values under which the maximum value of the similarity is minimum to the control unit 11 as groups of predictor variable values of the optimization result.

Next, the fourth optimization calculation method will be explained. At first, the control unit 11 sends the predictor variable range, response surface, groups of predictor variable values, and ratio of optimization and modeling to the optimization calculation unit 22. The optimization is the first optimization calculation method, and groups of predictor variable values under which response variable values are optimum are obtained. The modeling is the second optimization calculation method or third optimization calculation method, and groups of predictor variable values under which the distribution of response variable values or predictor variable values is even are obtained. Then, the optimization calculation unit 22 executes both the optimization and modeling such that the specified ratio of optimization and modeling is fulfilled, and sends thus obtained groups of predictor variable values to the control unit 11 as groups of predictor variable values of the optimization result. By employing this optimization calculation method, both the optimization and modeling can be performed.

Next, the details of the performance of the statistical information calculation will be explained. The statistical information calculation unit 31 employs one of the following three statistical information calculation methods. In the first statistical information calculation method, the statistical information calculation unit 31 generates regression tree data from groups of predictor variable values and response variable values, and sends thus generated regression tree data to the control unit 11 as statistical information. In the second statistical information calculation method, the statistical information calculation unit 31 generates principal component analysis data from groups of predictor variable values and response variable values, and sends thus generated principal component analysis data to the control unit 11 as statistical information. In the third statistical information calculation method, the statistical information calculation unit 31 generates neural network data from groups of predictor variable values and response variable values, and sends thus generated neural network data to the control unit 11 as statistical information.

Next, the details of the performance of the intensive calculation will be explained. The intensive calculation unit 32 calculates groups of predictor variable values of the optimization result using statistical information of one of regression tree data and principal component analysis data.

In case of using the regression tree data, the control unit 11 sends the predictor variable range, response variable range, regression tree data, and similarity threshold value to the intensive calculation unit 32. The intensive calculation unit 32 samples groups of predictor variable values under which response variable values calculated using the regression tree data fulfill the response variable range as well as the similarity of groups of predictor variable values to be obtained and input groups of predictor variable values is equal to or smaller than the similarity threshold value, and sends thus obtained groups of predictor variable values to the control unit 11 as groups of predictor variable values of the optimization result.

On the other hand, in case of using the principal component analysis data, the control unit 11 sends the predictor variable range, respective principal component value ranges, principal component analysis data, and similarity threshold value to the intensive calculation unit 32. The intensive calculation unit 32 samples groups of predictor variable values under which respective principal component value ranges are fulfilled as well as the similarity of groups of predictor variable values to be obtained and input groups of predictor variable values is equal to or smaller than the similarity threshold value, and sends thus obtained groups of predictor variable values to the control unit 11 as groups of predictor variable values of the optimization result.

Next, the performance of the display will be explained. The control unit 11 accepts the designation of display from the input unit 51 all the time, and generates display images based on the statistical information when receiving the designation of display, and sends thus generated display images to the display unit 52. As described above, as the statistical information, there are regression tree data, principal component analysis data, and neural network data, and specific examples of display images based on the respective statistical information will be explained.

Figure 6:
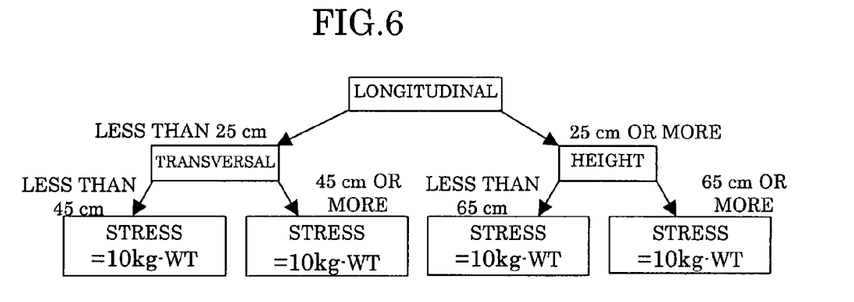
FIG. 6 shows a view indicative of one example of display images based on regression tree data according to the present invention.
Figure 7:
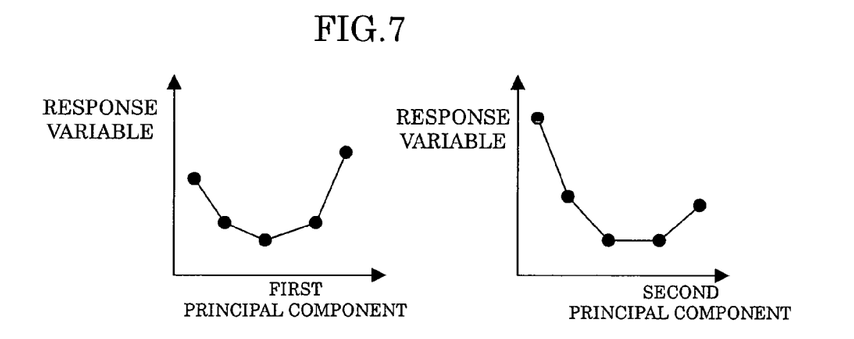
FIG. 7 shows a view indicative of one example of display images based on principal component analysis data according to the present invention.
Figure 8:
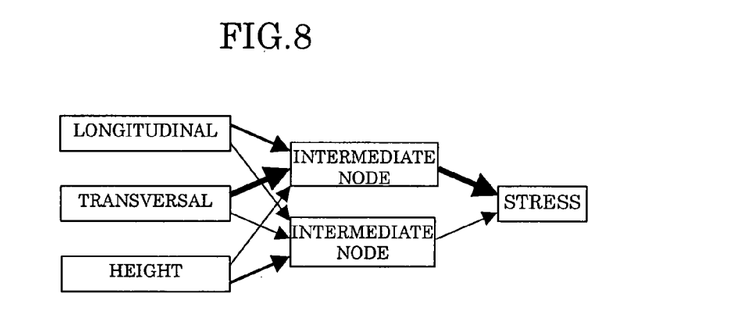
FIG. 8 shows a view indicative of one example of display images based on neural network data according to the present invention.

FIG. 6 shows a view indicative of one example of display images based on regression tree data according to the present invention. In FIG. 6, as predictor variables, longitudinal, transversal, and height dimensions are shown, while as response variables, stresses are shown. Employing this display image, the understanding of the user can be advanced concerning the relationship of the response variables with respect to the region of the predictor variables. FIG. 7 shows a view indicative of one example of display images based on principal component analysis data according to the present invention. In FIG. 7, the relationship between the first principal component and the response variables, and the relationship between the second principal component and the response variables are shown. Employing this display image, in case the number of predictor variables is large, the display image can be displayed with a small number of predictor variables. FIG. 8 shows a view indicative of one example of display images based on neural network data according to the present invention. In FIG. 8, as input nodes, longitudinal, transversal, and height dimensions being predictor variables are shown, and two intermediate nodes are shown, and, as an output node, a stress being a response variable is shown. Employing this display image, as the intensity of relationship is represented by the thickness of arrow connecting nodes, the influence by the respective nodes can be represented.

It is not required to use all the response surface calculation unit 21, optimization calculation unit 22, statistical information calculation unit 31, intensive calculation unit 32, clustering calculation unit 41, analysis result abbreviation unit 42, and analysis result substitution unit 43, necessarily, and individual functions may be omitted depending on the object of calculation.

In this embodiment, the optimum design calculation system is realized by a grid computing system or a cluster type computing machine system, and each of the calculation nodes 2 is realized by a computer. On the other hand, the optimum design calculation system may be a SMP type computing machine, the calculation nodes 2 may be a CPU, and the optimum design calculation system may be configured by a single computer. Furthermore, in this embodiment, response variable values are calculated from groups of predictor variable values by making the calculation nodes 2 execute an analysis program. On the other hand, response variable values may be calculated from groups of predictor variable values using an experimental apparatus.

Using an analysis program according to the object, the present invention can be applied to the optimum design in the fields of structural analysis, fluid analysis, crash analysis, electromagnetic field analysis, acoustic analysis, etc.

Furthermore, a program that makes a computer configuring the optimum design management apparatus execute above-described respective steps can be provided as an optimum design management program. Above-described program can be executed by a computer configuring the optimum design management apparatus by storing the program in a computer-readable recording medium. The computer-readable recording medium may be a portable recording medium such as a CD-ROM, a flexible disk, a DVD disk, a magnetic optical disk, and an IC card, or database having computer programs, or other computers and their databases, or a transmission medium on a line.

On the other hand, a predictor variable transmission unit, a response variable reception unit, a control unit, and a display image generation unit correspond to the control unit in this embodiment. Furthermore, a response surface calculation unit corresponds to the response surface calculation unit and analysis result abbreviation unit in this embodiment. Moreover, an optimization calculation unit corresponds to the optimization calculation unit and analysis result substitution unit in this embodiment.

Industrial Applicability

As has been described above, according to the present invention, the accuracy of optimization can be improved by performing a plurality of response surface calculations concurrently as well as in parallel, and by performing wide-area search with respect to groups of predictor variable values. Furthermore, the understanding of the user can be advanced by displaying the relationship between groups of predictor variables and response variables. Moreover, since the calculation is intensively performed for the region in which response variables are presumed to be optimum, a persuasive calculation can be performed.

Furthermore, by performing the sampling such that the distribution of groups of predictor variables or response variables is even, the groups of predictor variables or response variables can be appropriately modeled. Moreover, since both the optimization and modeling are executed, the explanation effect can be improved with respect to the relationship between groups of predictor variables and response variables. Yet moreover, the accuracy of optimization in case the number of analysis results is small can be improved. Yet moreover, by limiting the predictor variable range to the region around which response variable values are optimum, the accuracy of optimization can be improved.

The invention claimed is:

1. An optimum design management apparatus that analyzes response variable values from groups of predictor variable values, and performs optimization using the analysis result, comprising:
    a predictor variable transmission unit that transmits, using a computer, first groups of predictor variable values to be used for the analysis to a calculation node, and designates the analysis;
    a response variable reception unit that receives, using the computer, response variable values of the analysis result from the calculation node;
    a response surface calculation unit that calculates, using the computer, at least one response surface from the first groups of predictor variable values and the received response variable values;
    an optimization calculation unit that calculates, using the computer, second groups of predictor variable values from the response variable values by using the at least one response surface in order that the second groups of predictor variable values come close to an optimization condition; and
    an analysis result substitution unit that calculates, using the computer, similarities between the first groups of predictor variable values and the second groups of predictor variable values respectively, and
    wherein when one of the calculated similarities fulfills a condition, the optimization calculation unit determines, as the first groups of predictor variable values for a next analysis, groups of predictor variable values corresponding to the calculated similarities except for the one of the calculated similarities, and
    the predictor variable transmission unit transmits the first groups of predictor variable values for the next analysis to the calculation node.

2. The optimum design management apparatus according to claim 1, further comprising:
    a clustering calculation unit that culls and clusters the second groups of predictor variable values into representative groups of predictor variable values of a predetermined number.

3. The optimum design management apparatus according to claim 1, wherein
    the response surface calculation unit calculates a plurality of response surfaces using different algorithms.

4. The optimum design management apparatus according to claim 1, wherein
    the response surface calculation unit calculates a plurality of response surfaces by carrying out the processing of calculating a response surface using a plurality of extracted groups of predictor variable values and response variable values, allowing overlapping, by a plurality of times with the manner of extraction changed, and outputs a response surface that is represented by a representative value of the plurality of response surfaces or outputs the plurality of response surfaces.

5. The optimum design management apparatus according to claim 1, wherein the optimization condition is groups of predictor variable values under which response variable values are optimum.

6. The optimum design management apparatus according to claim 1, wherein
    the optimization condition is groups of predictor variable values under which a distribution of response variable values is even.

7. The optimum design management apparatus according to claim 1, wherein being groups of predictor variable values under which response variable values are optimum is set to a first condition, being groups of predictor variable values under which the distribution of response variable values and predictor variable values is even is set to a second condition, and the optimization condition fulfills the first condition and second condition at a predetermined ratio.

8. The optimum design management apparatus according to claim 1, wherein
    the response surface calculation unit calculates the at least one response surface from the first groups of predictor variable values and the received response variable values except for response variable values which are not optimum and groups of predictor variable values corresponding to the response variable values which are not optimum.

9. An optimum design calculation system that analyzes response variable values from groups of predictor variable values, and performs optimization using the analysis result, comprising:
    a predictor variable transmission unit that transmits, using a computer, first groups of predictor variable values to be used for the analysis, and designates the analysis;
    a calculation node that performs, using an additional computer, the analysis based on predictor variable values from the predictor variable transmission unit, and calculates response variable values of the analysis result;
    a response variable reception unit that receives, using the computer, response variable values of the analysis result from the calculation node;
    a response surface calculation unit that calculates, using the computer, at least one response surface from the first groups of predictor variable values and the received response variable values;
    an optimization calculation unit that calculates, using the computer, second groups of predictor variable values from the response variable values by using the at least one response surface to in order that the second groups of predictor variable values come close to an optimization condition; and an analysis result substitution unit that calculates, using the computer, similarities between the first groups of predictor variable values and the second groups of predictor variable values respectively, and wherein when one of the calculated similarities fulfills a condition, the optimization calculation unit determines, as the first groups of predictor variable values for a next analysis, groups of predictor variable values corresponding to the calculated similarities except for the one of the calculated similarities, and the predictor variable transmission unit transmits the first groups of predictor variable values for the next analysis to the calculation node.

10. An optimum design management method that analyzes response variable values from groups of predictor variable values, and performs optimization using the analysis result, comprising:

transmitting first groups of predictor variable values to be used for the analysis to a calculation node, and designates the analysis;

receiving response variable values of the analysis result from the calculation node;

calculating, using a computer, at least one response surface from the first groups of predictor variable values and the received response variable values;

calculating second groups of predictor variable values from the response variable values by using the at least one response surface in order that the second groups of predictor variable values come close to an optimization condition; and calculating similarities between the first groups of predictor variable values and the second groups of predictor variable values respectively, and wherein when one of the calculated similarities fulfills a condition, the calculating of the second groups of predictor variable values determines, as the first groups of predictor variable values for the next analysis, groups of predictor variable values corresponding to the calculated similarities except for the one of the calculated similarities, and the transmitting includes transmitting the first groups of predictor variable values for the next analysis to the calculation node.

11. A computer-readable recording medium recording an optimum design management program that makes a computer execute an operation including analyzing response variable values from groups of predictor variable values, and performing optimization using the analysis result, comprising:

transmitting first groups of predictor variable values to be used for the analysis to a calculation node, and designating the analysis;

receiving response variable values of the analysis result from the calculation node;

calculating at least one response surface from the first groups of predictor variable values and the received response variable values;

calculates second groups of predictor variable values from the response variable values by using the at least one response surface in order that the second groups of predictor variable values come close to an optimization condition; and calculating similarities between the first groups of predictor variable values and the second groups of predictor variable values respectively, and wherein when one of the calculated similarities fulfills a condition, the optimization calculation unit determines, as the first groups of predictor variable values for the next analysis, groups of predictor variable values corresponding to the calculated similarities except for the one of the calculated similarities, and the predictor variable transmission includes transmitting the first groups of predictor variable values for the next analysis to the calculation node.

12. The computer-readable recording medium according to claim 11, the program further makes the computer execute:

a clustering calculation process that culls and clusters the second groups of predictor variable values into representative groups of predictor variable values of a predetermined number.

13. The computer-readable recording medium according to claim 11, wherein the response surface calculation process calculates a plurality of response surfaces using different algorithms.

14. The computer-readable recording medium according to claim 11, wherein the optimization condition is groups of predictor variable values under which response variable values are optimum.

15. The computer-readable recording medium according to claim 11, wherein the optimization condition is groups of predictor variable values having reduced deviation of predictor variable values and response variable values.

* * * * *